United States Patent [19]

Draper et al.

[11] 4,331,446
[45] May 25, 1982

[54] SYNTHETIC COAL LOG

[75] Inventors: Edward F. Draper; Paul E. Bentley, both of Norfolk, Va.

[73] Assignee: EPA Energy Products, Inc., Norfolk, Va.

[21] Appl. No.: 146,789

[22] Filed: May 5, 1980

[51] Int. Cl.³ .......................... C10L 5/14; C10L 5/32
[52] U.S. Cl. ............................................. 44/24; 44/6
[58] Field of Search ............... 44/24, 20, 10 R, 10 D, 44/6

[56] References Cited

U.S. PATENT DOCUMENTS

| | | | |
|---|---|---|---|
| 778,096 | 12/1904 | Barnes | 44/24 |
| 1,123,581 | 1/1915 | Papadimitropulus | 44/20 X |
| 3,226,208 | 12/1965 | Mueller et al. | 44/6 X |
| 3,297,419 | 1/1967 | Eyre, Jr. | 44/20 X |
| 4,169,170 | 9/1979 | Doeksen | 44/6 X |
| 4,179,269 | 12/1979 | Yates et al. | 44/24 X |
| 4,191,535 | 3/1980 | Furman | 44/10 R |

*Primary Examiner*—Carl F. Dees
*Attorney, Agent, or Firm*—Schwartz, Jeffery, Schwaab, Mack, Blumenthal & Koch

[57] ABSTRACT

A method of making synthetic fireplace logs or the like and the logs so produced. Approximately 80–95% by weight of pulverized coal is mixed with 5–20% by weight of dry paraffin to form a heterogeneous mixture. The mixture is fed into a cylindrical log mold and subjected to pressures of approximately 5,000 to 12,000 psi. The logs are then coated with a liquid paraffin.

12 Claims, 1 Drawing Figure

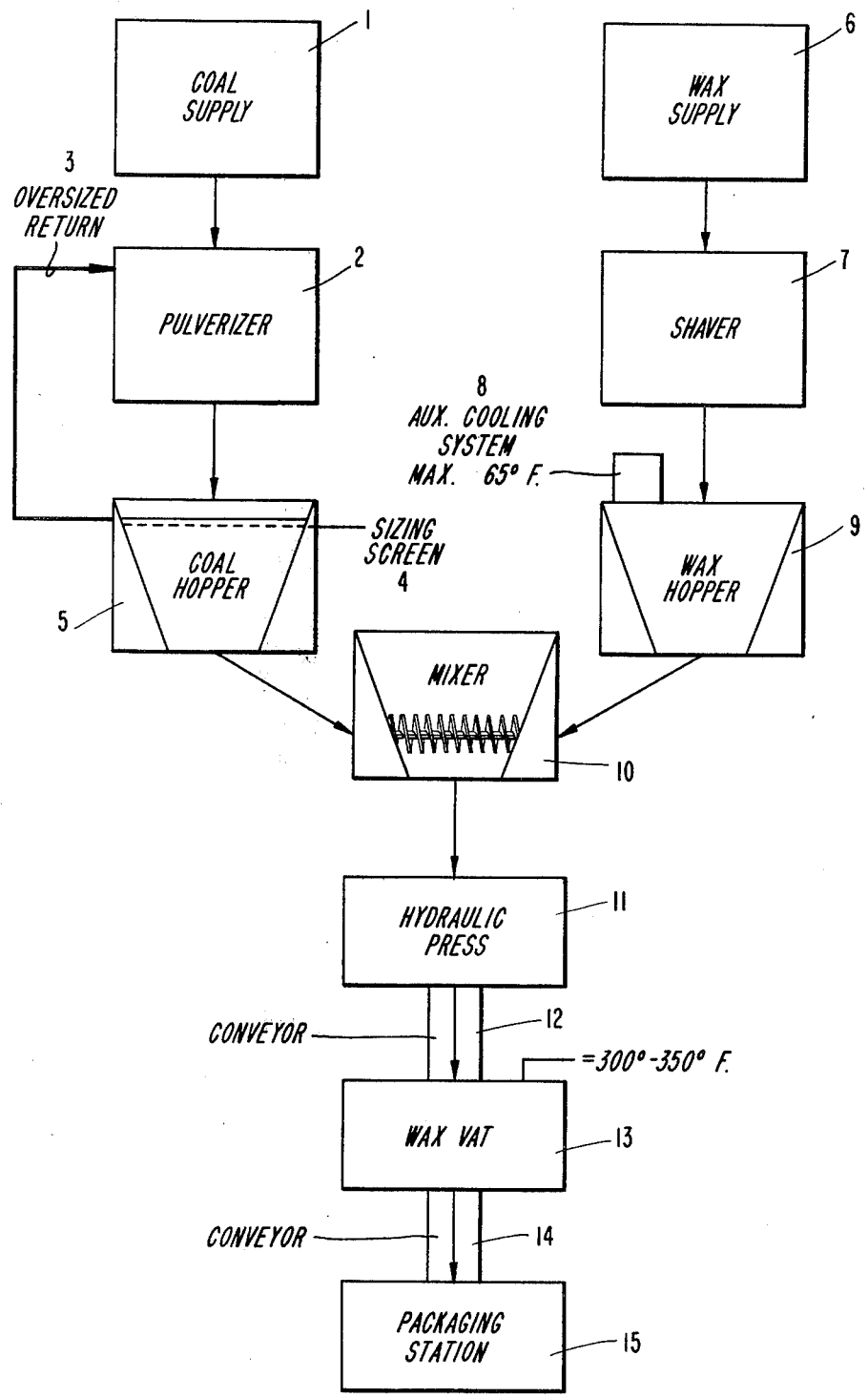

SYNTHETIC COAL LOG

BACKGROUND AND SUMMARY OF THE INVENTION

The world energy crisis has greatly stimulated a demand for solid fuel products, both natural and artifical. This invention relates generally to a method of producing a solid fuel element, and more specifically to a method of producing fireplace logs having a relatively large amount of coal. The logs have a relatively small amount of paraffin and a surface impregnated with a solution of paraffin and detergent. The invention is also directed to the logs so produced.

In the past, synthetic fireplace logs have been introduced into the market place. Many synthetic fireplace logs in the prior art have been made from material such as paper, sawdust, woodchip or shavings and waste vegetable fibers combined with some forms of adhesive binders. For example, U.S. Pat. No. 4,179,269 discloses a fireplace log and a method of producing the log by using ground coal, wood fibers and slack wax. However, many of these logs require large amounts of energy to manufacture and contain large amounts of paraffin and other wax-like substances. High wax content logs are generally volatile and are not recommended for any tupe of freestanding fireplace application. In addition, the BTU output of the prior art synthetic fireplace logs is relatively low and the burning time considerably less as compared with synthetic logs made in accordance with the invention. Furthermore, the manufacturing processes of the prior art have produced synthetic fireplace logs that are extruded from compacting compression equipment. Such procedures require relatively expensive compression equipment to produce the required high pressures on the order of 55,000 pounds per square inch. Logs made from such equipment produce, when ignited, undesirable airborne products which produce a fire hazard. The heating efficiency of such fireplace logs is undesirably low.

Therefore, an objective of the invention is to overcome the above and other disadvantages of the prior art by the provision of a greatly improved solid fuel product, particularly suitable for use as a solid igniter for fireplace logs and also capable of a wide utility in the solid fuel field.

According to the present invention, a coal log is produced having superior form but is less expensive than prior art logs in that only a small percentage of solid paraffin is required. The log is produced by a simple method that requires relatively low compression. In addition, the outer surface of the log may be coated with a paraffin or a solution of paraffin and a surfactant. It is also advantageous to incorporate the surfactant into the body of the solid fuel element. According to the method of the present invention, a major portion of pulverized coal and a minor portion of paraffin wax, in solid form, are mixed so that a heterogeneous extrudeable mixture is formed. Surfactant soluble in paraffin may be present or added at this stage. The mixture is compressed. The compressed form may then be passed through a liquid wax mix consisting of paraffin or paraffin and surfactant.

According to the present invention, a fireplace log is produced consisting essentially of about 80-95% by weight of pulverized coal and approximately 5-20% by weight of paraffin wax.

It is an object of the present invention to provide a simple, inexpensive and efficient method for the manufacture of a solid fuel element.

Another object of the invention is to provide a new and improved method for manufacture of a solid fuel element with efficient operations and at a low energy cost.

A further object of the invention is to provide an inexpensive fuel element having suitable characteristics for use as a fireplace log.

A still further object of the invention is to provide a safe solid fuel alternative with improved heat values.

Yet another object of the invention is to provide a coating for a coal fuel element which is easily ignitable and which renders the product clean to handle. The coating contains paraffin and a minor portion of surfactant or detergent.

These and other objects of the invention will become clear in reference to the detailed description of the invention.

BRIEF DESCRIPTION OF THE DRAWING

The sole drawing is a schematic flow diagram illustrating, in an exemplary manner, the manufacturing steps for producing a fireplace log in accordance with the present invention.

DETAILED DESCRIPTION OF THE PREFERRED EMBODIMENTS

Reference is directed to the sole FIGURE which schematically illustrates, in an exemplary manner, of the production of a solid fuel element in accordance with the invention. Coal from a coal supply 1 is passed through a pulverizer 2 in a specific amount or on a through feed basis for continuous operation. As coal in its natural state is dry, no drying of the coal is generally required. A suitable pulverizer that may be utilized is Model No. 19283 from J. B. Sedberry, Inc., Tyler, Texas. The pulverized coal is fed through a sizing screen 4 and then into a hopper 5. The screen 4 is preferably approximately 3/16" and is utilized to maintain a constant size of the coal for subsequent mixing with the paraffin. The consistency of the size of the pulverized coal is important in order for the finished product to have a uniform density throughout the log. Any coal that has not been pulverized to a suitable size is rejected and fed or recycled through an oversized return 3 back to the pulverizer 2. The pulverized coal in hopper 5 is fed into a mixer 10. The mixer 10 may be of any conventional type which achieves thorough mixing. The flow of the pulverized coal is metered so that the pulverized coal is approximately 80-95% by weight and the paraffin approximately 5-20% by weight.

The petroleum based wax used in the present invention is conventional paraffin wax. The preferred wax for usage in the process is Chevron Refined Wax 160/165, a refined paraffin wax having a melting point of 70° C., oil content of 0.3% by weight, a hardness penetration of 9 at 77° F., a specific gravity of 0.930 at 73° F./4° C., a refractive index at 80° C. at 1.437, a flash point of 500° F., an auto-ignition temperature of 730° F., and all water removed.

A supply of paraffin is fed from supply hopper 6 into a shaver 7. The shaver contains a series of revolving knives which cut the slabs of paraffin into thin shavings. The shavings are fed from the shaver 7 into a wax hopper 9 and are subsequently fed to mixer 10. In mixer 10 the pulverized coal is itself effective to further break up the paraffin into a small granular size so as to form a thorough mixture with the coal. The use of the coal in mixer 10 to effectively pulverize the paraffin eliminates the need for separately granularizing the paraffin. Within hopper 9 it is important that the paraffin be maintained in a dry state and not become soft so as to insure its subsequent breakup by the pulverized coal. For this purpose, when utilizing Chevron Wax 160/165, the temperature of the wax shavings is maintained at or below approximately 65° F. The shavings are thus brittle enough to permit their subsequently fine break-up when mixed with the pulverized coal thereby forming an excellent heterogeneous mix. In order to maintain the require cool temperatures, an auxiliary cooling system 8 is operatively connected to the wax hopper 9 as shown in the FIGURE. The auxiliary cooling system maintains the temperature of the hopper 9 at or below 65° F. The hopper 9 is enclosed with insulating material to prevent sweating on the inside of the hopper.

The wax shavings and pulverized coal are both metered prior to feeding into hopper 10 so that the pulverized coal is preferably 80-95% by weight and the paraffin wax is preferably 5-20% by weight.

The heterogeneous mix of pulverized coal and paraffin leaves mixer 10 and is fed into a mold contained within a hydraulic press 11. The mixture is compressed in the mold at approximately 5,000-12,000 psi. The mold shape is preferably chosen to be cylindrical to form a fireplace log. During the compression, the paraffin flows throughout the entire log to ensure a solid log product. It is believed that the pressures being exerted on the mixture by press 11 increases the molecular activity of the paraffin and causes the paraffin to flow evenly throughout the entire mold. Paraffin is a hydrocarbon substance and its molecular structure is maintained in a stable state at approximately 150° F. or less ambient temperature. Utlizing paraffin in its stable form permits a paragenetic bonding of the coal and paraffin. The paraffin remains in its stable state and thus does not require the relatively long time (approximately 72 hours) to attain a stable state after solidification from a liquid. It is believed that the elimination of this change in state, from liquid to solid, and the utilization of a paragenetic bond produces a more durable fuel element having greater burning consistency and uniformity.

The compressed log leaves the hydraulic press 11 and is fed by conveyor 12 through a hot wax vat 13 in order to coat the log. The hot wax vat 13 may simply contain paraffin without any detergent. (The terms surfactant and detergent are used interchangeably throughout the description and claims.) Most preferably, however, a mixture of 99½-95% paraffin wax by volume and ½-5% detergent by volume is utilized. The mixture is heated to approximately 300°-350° F. Any detergent may be utilized as long as it is capable of mixing with the paraffin wax. Preferably, the detergent is soluble in the paraffin. For the wax vat 13, the logs travel by conveyor 14 to a packaging station 15 where the logs are made ready for shipment.

It is believed that the utilization of a surfactant within the paraffin as a coating on the log produces a superior bonding of the paraffin to the coal due to greater penetration of the paraffin-detergent mix over pure paraffin. The surfactant lowers the surface tension and thus increases the wettability of liquid paraffin wax by permitting deeper and more rapid penetration of the wax into the log surface. The final product is resistant to abrasion and mechanical breakage and is chip resistant.

In accordance with another aspect of the invention, a surfactant may be added to the paraffin wax prior to its input into the wax supply hopper 6. Most preferably, the surfactant is added to the paraffin in the manufacturing stage when the paraffin is normally in its liquid state and prior to its solidification for block sale and shipment. The concentration of detergent to paraffin may be the same as used in the coating stage, namely 99½-95% by volume paraffin to ½-5% by volume detergent. The inclusion of the detergent within the paraffin which bonds the interior of the fuel element produces similar effects as previously noted with respect to the surface coating. The detergent containing the paraffin thus penetrates more rapidly into small spaces or crevices during compression and permits a more rapid formation of the paragenetic bond.

The following examples are illustrious of the log production in accordance with the present invention.

EXAMPLE 1

Coal is pulverized in a pulverizer and passed through a screen mesh of 3/16" to a hopper. Chevron Refined Wax 160/165 is fed into a shaver and rendered into very thin shavings. The temperature of the paraffin within the shaver is maintained below or approximately at 65° F. The shavings and pulverized coal are mixed together to form a heterogeneous mixture. The coal is 95% by weight and the Chevron Refined Wax is 5% by weight. The heterogeneous mixture is passed into a hydraulic press at approximately 12,000 psi to form the log. The log is passed through a hot wax vat containing 98% by volume paraffin and 2% by volume detergent. The detergent is chosen to be Tergitol 15-S-3 which is soluble in paraffin. Tergitol 15-S-3 is a nonionic, linear alcohol ether of polyethylene glycol manufactured by Union Carbide. The temperature of the paraffin within the vat is 350° F. A log so produced has excellent form and burning characteristics and is entirely suitable for use as a fireplace log.

EXAMPLE 2

Logs are produced in the same manner as in Example 1 except that the mixture is 90% pulverized coal by weight and 10% Chevron Refined Wax 160/165 by weight. Pressures on the order of 2500 psi are effective to form the fuel element. The logs so produced have excellent form and excellent burn characteristics.

EXAMPLE 3

Logs are produced in the same manner as in Example 1 but the mixture is 80% pulverized coal by weight and 20% Chevron Refined Wax 160/165 by weight. Pressures on the order of 300-1000 psi may be utilized.

It is possible, within the spirit of the invention, to produce fireplace logs with less than 5% paraffin and greater than 95% coal. For example, 3-5% paraffin and 97-95% by weight coal may be utilized. The disadvantage in utilizing less than 5% paraffin is that a higher compression force is needed to form the fuel element in press 11. Additionally, a diminishing ignition and burn characteristics of the resulting product are noted.

It is also possible within the spirit of the invention to add chemical flame coloring agents such as copper sulphate, sodium nitrate, potassium nitrate, potassium chloride and sodium chloride to the coal/paraffin mix before compression.

Additional chemical agents, particularly types of essence such as pine, cedar, spruce, bay, amber, maple and piñion may also be added.

Also within the spirit of the invention, a solid coal lump (without paraffin therein) may simply be coated with detergent containing paraffin. If the coal is in the form of charcoal commonly used for outdoor cooking, the detergent containing paraffin coating may be ignited without the use of conventional lighter fuel aids. For both charcoal and harder coal elements, the detergent containing paraffin coating permits the coal to be easily handled in a clean manner inasmuch as the chip-resistant coating prevents the coal dust formation normally present in lump coal. The percentages of detergent to paraffin in the coating may be the same as given above.

It will thus be seen that according to the present invention a method of log production has been provided that is extremely simple and energy efficient and requires only relatively unsophisticated, commercially available equipment. The raw materials are readily available and, according to the present invention, a fireplace log is produced that is inexpensive yet has a form and burn characteristic that makes it extremely suitable for use as a fireplace log.

While it is to be understood that the form of the invention illustrated and described is a preferred embodiment, it will be apparent to those of ordinary skill in the art that changes and modifications may be made to the preferred embodiment without departing from the true spirit and scope of the invention as defined by the appended claims.

What is claimed is:

1. A method of making a solid fuel element comprising the steps of:
   (a) mixing a major portion of coal and a minor portion of a mixture of paraffin wax in a solid state and a surfactant so that a solid state mixture is formed, and
   (b) compressing said solid state mixture to form said solid fuel element.

2. The method of claim 1 further comprising coating said solid fuel element.

3. The method of claims 1 or 2 wherein said major portion of coal is about 80-95% by weight and said minor portion of paraffin wax is about 5-20% by weight.

4. The method of claim 2 wherein said paraffin wax is in the form of thin shavings when mixed with said coal, said mixing step further including the step of granularizing said wax shavings by mixing same with said coal.

5. The method of claims 1 or 2 wherein said compressing step is performed at a pressure of about 5,000-12,000 psi.

6. The method of claims 1 or 2 further comprising the step of maintaining the temperature of said paraffin wax at 65° F. or less prior to said mixing step.

7. The method of claim 2 wherein said solid fuel element is coated with paraffin.

8. A solid fuel element consisting essentially of:
   (a) a major portion of coal,
   (b) a minor portion of paraffin wax, and
   (c) a minor portion of surfactant.

9. The solid fuel element of claim 8 wherein said major portion of coal is about 80-95% by weight, said minor portion of paraffin wax is about 20-5% by weight, and said minor portion of surfactant is about ½-5% by volume of the amount of said minor portion of paraffin wax.

10. The solid fuel element of claim 8 wherein said coal paraffin wax and surfactant are homogeneously interspersed throughout said solid fuel element.

11. The solid fuel element of claim 8 wherein the total amount of said coal and said surfactant are interspersed with a portion of the total amount of said paraffin throughout said solid fuel element and wherein the remaining amount of said paraffin forms a coating of said solid fuel element.

12. The solid fuel element of claim 8, wherein said coal comprises pulverized coal having a particle size of less than about 3/16".

* * * * *